March 20, 1956   S. S. TRILLING ET AL   2,738,561
FASTENER DEVICE
Filed April 2, 1952
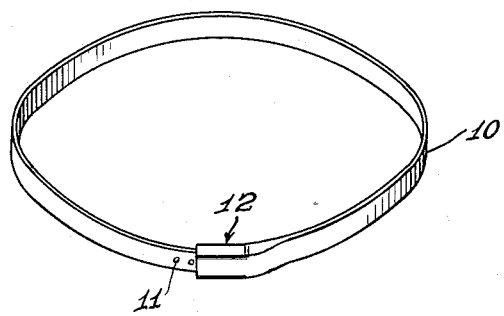
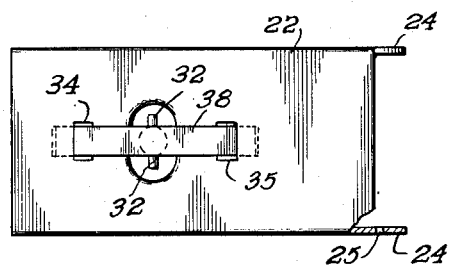
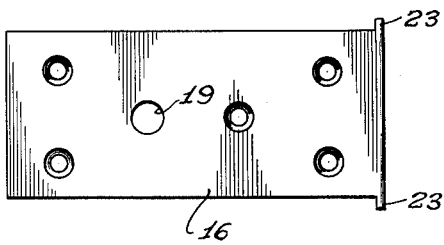
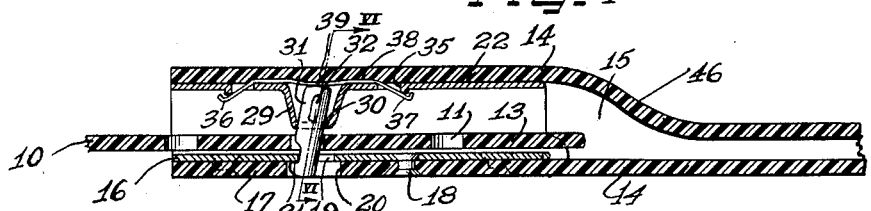
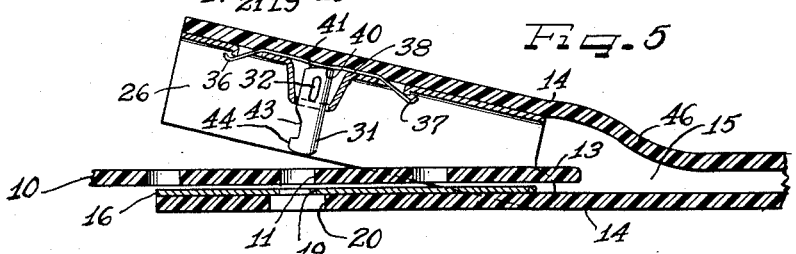
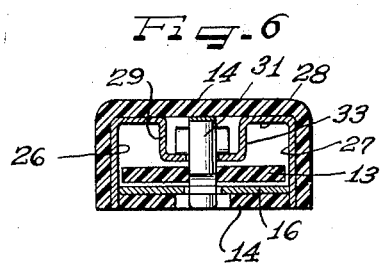
INVENTORS
SANFORD S. TRILLING
NOAH H. SLOAN
Attys.

United States Patent Office 2,738,561
Patented Mar. 20, 1956

2,738,561

FASTENER DEVICE

Sanford S. Trilling and Noah H. Sloan, Chicago, Ill.

Application April 2, 1952, Serial No. 280,076

1 Claim. (Cl. 24—206)

This invention relates to a fastener device and more particularly to a device for use on a belt, strap or the like for fastening the two ends together.

It is an important object of this invention to provide a fastener device that is both attractive and of a novel, improved structure particularly adapting it for use in place of the ordinary belt buckle on belts used for wearing apparel.

It is a further object of this invention to provide a fastener device adapted for association with a tubular belt structure which receives and retains the overlapping free end of the belt.

Other and further important objects of this invention will become apparent from the following description and appended claim.

On the drawings:

Figure 1 is a perspective view of a belt using a fastener device of my present invention, showing the belt in closed, looped state.

Figure 2 is a top plan view of one of the members of the fastener device, with the covering removed.

Figure 3 is a top plan view of the plate to which the member of Figure 2 is hingedly connected.

Figure 4 is an enlarged longitudinal sectional view of the fastener device in closed position.

Figure 5 is a similar enlarged, longitudinal sectional view of the fastener device in open condition.

Figure 6 is a transverse sectional view taken substantially along the line VI—VI of Figure 4 with parts in elevation.

Figure 7 is an enlarged fragmentary sectional view showing an added safety lock feature.

Figure 8 is a fragmentary top plan view of the structure shown in Figure 7.

As shown on the drawings:

The reference numeral 10 indicates generally a belt, strap, or the like, usually of flexible material such as cloth, leather or a synthetic plastic. As illustrated, the belt 10 is provided with spaced perforations 11 toward one free end thereof to provide the usual feature of adjustability. A fastener device, indicated generally by the reference numeral 12 is secured to the other free end of the belt 10. As shown in Figures 4 and 5, the apertured end 13 of the belt 10 may be of a single thickness, or it may be laminated, while the other free end, indicated by the reference numeral 14, is generally tubular to provide an open ended recess 15 into which may be inserted the fastener, proper, of my invention.

The fastener device itself comprises a lower plate 16 of rigid material, such as metal that is adapted to be secured to the lower extension 17 of the belt end 14, as by means of hollow rivets 18. Said plate 16 is apertured as at 19 for registry with one of the apertures 11 of the free belt end 13, and also for registry with an aperture 20 in the lower belt end portion 17. The aperture 20 is preferably slightly larger than the aperture 19 to provide an overhanging edge 21 in the portion of the metal plate 16 defining said aperture.

A member 22 (Fig. 2), which may be formed of stamped sheet metal, is adapted to be hingedly connected to the plate 16. For this purpose, the plate 16 is provided at one end with laterally extending lugs 23 constituting a pintle for pivotally mounting the member 22, and the member 22 is provided with rearwardly extending portions 24, having apertures 25 into which said lugs 23 extend. The member 22, as shown in Figures 4 and 5, is thus pivotally mounted with respect to the plate 16 about the axis provided by the pintle-forming lugs 23, 23.

The member 22, like the plate 16, is generally rectangular in plan view, and is provided with downwardly turned lateral flanges (Fig. 6) indicated by the reference numerals 26 and 27, and with the extensions 24, 24 formed on the lower rear edges of said lateral extensions 26, 27. The member 22 is thus shaped like an inverted U in cross-section and is open at its ends. The top, or web portion 28 is provided with a downwardly stamped, hollow boss 29 positioned generally centrally of the web portion and in vertical registry with the aperture 19 of the plate 16. Said boss 29 is provided with an opening 30 in its lower face for the projection therethrough of a pin 31. Said pin 31, which is of generally cylindrical shape, is provided with oppositely extending trunnions 32 adapted to rest upon the lower wall 33 of he boss 29 to permit limited pivotal movement of said pin 31 about said trunnions 32 as a fulcrum.

The upper wall or web 28 of the member 22 is provided with spaced openings 34 and 35, through which extend the downturned ends 36 and 37 of a spring metal strip 38.

Said spring metal strip 38 has a slightly bowed intermediate portion 39 against which the upper end of the pin 31 is normally in slight pressure contact. Said upper end of the pin 31 is provided with a flat portion 40 normal to the axis of the pin 31, and with a slanting portion 41 extending forwardly at a slight angle to the surface 40. Said surfaces 40 and 41 constitute camming surfaces, as will later be explained. The forward, or left-hand face of the pin 31 as viewed in the drawings (Figures 4 and 5), is provided with a recess 43 and a lower tooth-like projection 44. The proportions of the pin 31 are such that when the fastener device is closed, as in Figure 4, the recess 43 receives the adjacent overhanging edge 21 of the aperture 19, while the tooth-like projection 44 extends beneath and against the under side of said overhanging portion 21.

In the closed position of the fastener device illustrated in Figure 4, the free end 13 of the belt 10 extends into the opening 15 provided by the tube-like belt end portion 14 and by the open ended, inverted U-shaped member 22, with one of the apertures 11 in registry with the aperture 19 and with the pin 31 extending through said apertures 11 and 19 with the lower end thereof in engagement with the overhanging edge portion 21, as previously described. This engagement is brought about by forces acting along the end portions 13 and 14 of the belt 10 tending to separate said end portions, since under these conditions the pin 31 becomes cocked, as shown, with the slanting portion 41 in contact with the under surface of the bowed portion 39 of the spring 38. The pin will stay in this cocked condition until the wearer of the belt pushes the end 13 inwardly relatively to the member 22 to cause the pin to move into its position normal to the plane of the web portion 28 and with the flat surface 40 in contact with the under surface of said spring 38, as shown in Figure 5. The upper end of the fastener device can then be pivoted into open position, as in Figure 5, about the hinge connection constituted by the pintle 23, 23 and the rearwardly extending portions 24, 24. With the pin and the other parts of the fastener device and belt ends in proper relative positions, pivoting movement to open the fastener withdraws the lower end of the pin through the apertures 19 and 11 to permit the belt end 13 to be withdrawn from the fastener device.

As shown in Figure 6, the upper portion of the belt end 14 overlies the web portion 28 and is bent around the lateral walls 26 and 27 of said member 22 to overlie the same, and the surfaces in contact between said belt end 14 and said member 22 may be secured together in any desired manner, as by means of an adhesive or a metallic crimp casing. The fastener device proper is thus wholly enclosed within the fabric of the belt 10. The movable portion of the fastener device represented by the member 22 is capable of being pivoted even though secured to the upper belt end portion 14, by reason of the flexibility of the connecting belt portion 46 (Figs. 4 and 5). Thus, the fastener device may be made a substantially integral part of the belt end 14 yet be free to move relative to the lower portion of said belt end 14.

In Figures 7 and 8 there is shown a safety lock which prevents the pin 31 being accidentally moved to unlocked position. This lock consists of a transverse pin 47 pivotally mounted in a thickened plate 16a and which traverses the aperture 19a therein which is for the same purpose as the aperture 19. The pin 47 is notched as at 48 to afford clearance for release of the pin 31 when that pin is rotated 180° from the position thereof shown in Figures 7 and 8. When in the position shown in said figures, a cylindrical portion of the pin 47 engages the back of the pin 31 and prevents disengagement thereof. A knurled knob 49 is provided for rotating the pin 47.

It will be understood that modifications and variations may be effected without departing from the scope of the novel concepts of the present invention.

We claim as our invention:

A fastener device comprising an apertured plate, a flanged member hinged to one end of said plate for pivotal movement toward and away from said plate, said member providing with said plate an opening at the other end for the reception of an apertured end to be fastened, a pin carried by and depending from said member toward said plate and adapted to pass through the apertured end and be engaged with said apertured plate to fasten said end, and a notched rotatable pin extending transversely of said plate and traversing the aperture therein, said pin being adapted to be rotated into engagement with the first mentioned pin to prevent dislodgement thereof or to be rotated so that the notch registers with said pin to permit of such dislodgement.

References Cited in the file of this patent

UNITED STATES PATENTS

| | | |
|---|---|---|
| 184,038 | Fisk | Nov. 7, 1876 |
| 198,545 | Koehler | Dec. 25, 1877 |
| 823,277 | Hirsh | June 12, 1906 |
| 2,171,448 | Holtz | Aug. 29, 1939 |
| 2,253,749 | Beazley | Aug. 26, 1941 |
| 2,622,298 | Macedo | Dec. 23, 1952 |

FOREIGN PATENTS

| | | |
|---|---|---|
| 266,053 | Italy | July 17, 1929 |